United States Patent [19]

Malmasson

[11] Patent Number: 5,347,552
[45] Date of Patent: Sep. 13, 1994

[54] METHOD FOR USING A THIMBLE OF A PRESSURIZED WATER NUCLEAR REACTOR AND DEVICE FOR ADJUSTING THE AXIAL POSITION OF THE THIMBLE

[75] Inventor: Jacques Malmasson, Evry, France

[73] Assignee: Framatome, Courbevoie, France

[21] Appl. No.: 88,668

[22] Filed: Jul. 6, 1993

[30] Foreign Application Priority Data

Jul. 3, 1992 [FR] France .................. 92 08263

[51] Int. Cl.$^5$ ............................................. G21C 17/00
[52] U.S. Cl. ...................................................... 376/254
[58] Field of Search ........................ 376/254, 255, 260

[56] References Cited

U.S. PATENT DOCUMENTS

| | | | |
|---|---|---|---|
| 3,769,156 | 10/1973 | Brecy | 376/254 |
| 4,728,479 | 3/1988 | Merkovsky | 376/254 |
| 4,917,853 | 4/1990 | Feurgard | 376/254 |
| 5,120,491 | 6/1992 | Brown et al. | 376/254 |

Primary Examiner—Daniel D. Wasil
Attorney, Agent, or Firm—Pollock, Vande Sande & Priddy

[57] ABSTRACT

The thimble (10) is introduced into a guidance duct consisting of a guidance tube (5) joining a measurement room (3) to the vessel (1) of the nuclear reactor, a vertical channel passing through the lower internals (14) of the reactor beneath the core (12) and a tube guide (17) of an assembly of the core (12). The closed end of the thimble penetrates into the tube guide of the fuel assembly as far as a defined level. The position of the thimble (10) is modified along the axis of the guidance duct, between two periods of use of the thimble in the nuclear reactor, so as to modify the position of the heavy wear zones of the wall of the thimble (10) with respect to the guidance duct. Preferably, the axial position of the thimble (10) is adjusted by using an extension of the thimble fixed to a seal (8) of the guidance duct and into which the end of the thimble is screwed.

8 Claims, 5 Drawing Sheets

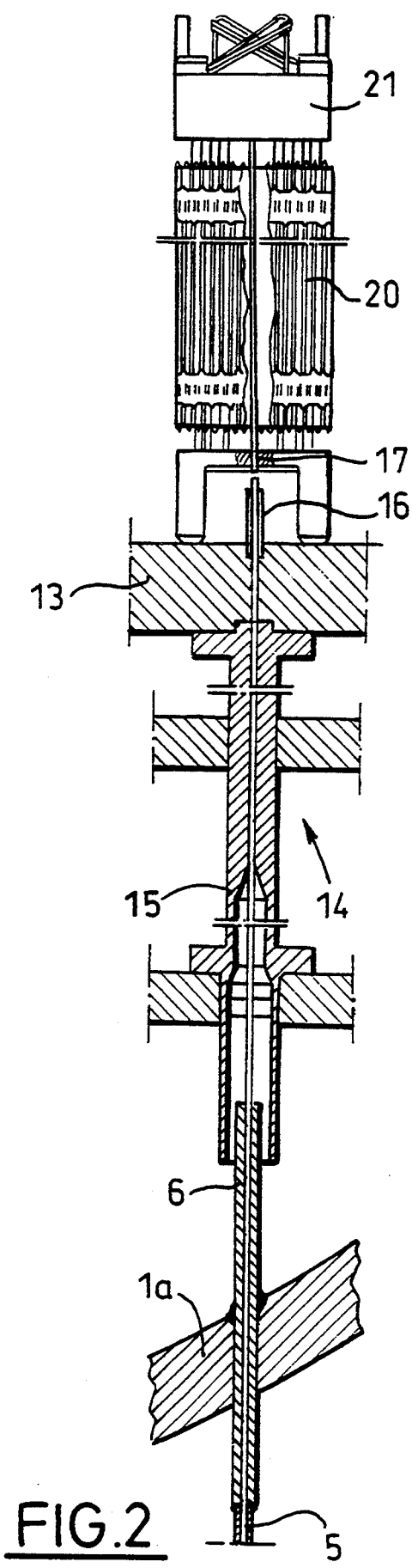
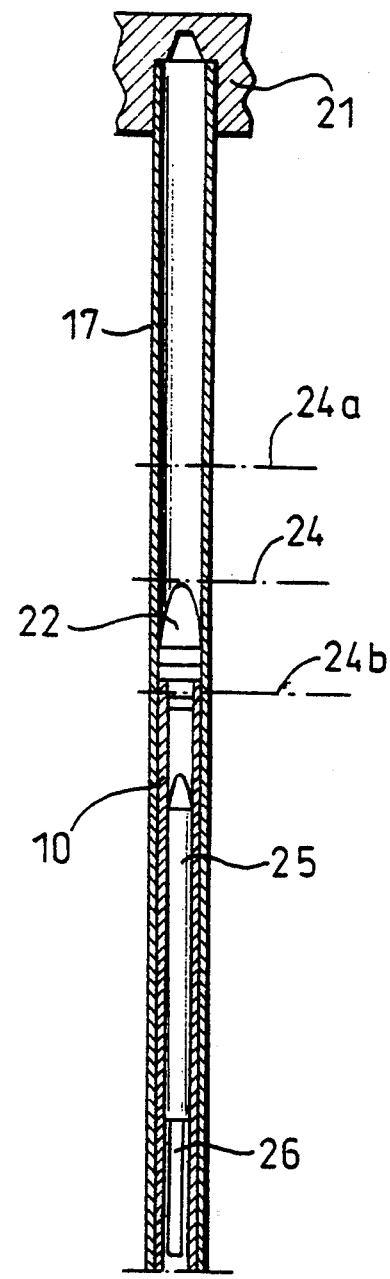
FIG.2
FIG.3 ns, 5,347,552

METHOD FOR USING A THIMBLE OF A PRESSURIZED WATER NUCLEAR REACTOR AND DEVICE FOR ADJUSTING THE AXIAL POSITION OF THE THIMBLE

FIELD OF THE INVENTION

The invention relates to a method for using a measurement duct or thimble, closed at one of its ends for a nuclear reactor cooled by pressurized water, so as to extend the service life of the thimble and to a device for adjusting the position of the thimble in an instrumentation guidance duct.

BACKGROUND OF THE INVENTION

Pressurized water nuclear reactors comprise a core formed from assemblies of prismatic shape arranged vertically and resting on a support plate, inside the vessel of the nuclear reactor.

During operation of the nuclear reactor, it is necessary periodically to perform flux measurements right inside the core. For this purpose fission detectors of very small dimensions are used which are displaced by remote control with the aid of teleflex cables inside tubes, called thimbles which are closed at one of their ends. The thimbles are introduced according to a predetermined distribution into certain assemblies of the core, after passing inside an instrumentation guidance duct. The instrumentation guidance duct comprises a guidance tube connecting a measurement room to the bottom of the vessel of the reactor, at the level of a penetration sleeve for the bottom and a vertical channel passing through the lower internals of the reactor, in alignment with the vertical tube-guide of the fuel assembly into which the thimble is introduced.

By displacement of the flux detectors inside the thimbles introduced into the assemblies, flux measurements may be carried out over the entire height of the core.

The thimbles must be able to be extracted from the assemblies of the core, for example in order to facilitate reloading of the core of the reactor or even of the set of corresponding instrumentation guidance ducts. To this end, traction is exerted on the end of the thimbles, from the measurement room arranged laterally with respect to the vessel well of the reactor.

When the thimbles are installed in their respective guidance ducts and in the tube guide of the corresponding assemblies, the closed end part of the thimble, generally consisting of a bullet-shaped end plug facilitating the guidance and the displacement of the thimble, is placed at a reference level in the upper part of the tube guide of the assembly.

The position of the thimble in the axial direction of the guidance duct is therefore fixed once and for all, and the same zones of the wall of the thimble are always placed facing the same zones of the guidance duct.

Due to the circulation of the cooling water of the reactor inside the guidance ducts, and in certain zones, for example before the inlet into the tube guide of the fuel assembly where the thimble is directly exposed to the water filling the vessel of the reactor, vibrations of the thimble are produced inside the guidance duct, due to the fact that the inside diameter of the guidance duct is substantially greater than the outer diameter of the thimble so as to allow the thimble to be extracted and installed in the guidance duct.

In certain zones of the guidance duct and in particular in the upper part of the vertical channel inside the internals, friction is produced generating wear between the wall of the thimble and the inner surface of the guidance duct.

The wear of the wall of the thimble in the zones subjected to friction may lead to deterioration and even to breakage of the thimble, due to the fact that the wear is always produced in the same zones of the wall of the thimble and during long periods of time corresponding to the duration of use of the nuclear reactor.

In the event of a deterioration of the thimble showing up as a loss in sealing, contaminated cooling liquid is likely to enter the measurement room via the inside of the thimble.

There have been proposed devices for holding the thimbles transversely inside certain parts of the guidance duct, allowing vibration, friction and wear to be limited.

However, such devices may be difficult to install in the guidance duct and may necessitate the use attached components which are likely to become detached by breaking and to become loose parts in the primary circuit of the reactor.

To date no method was known enabling the wear of the thimbles to be limited without using a transverse holding device.

The object of the invention is therefore to propose a method for using a measurement duct or thimble, closed at one of its ends, for a nuclear reactor cooled by pressurized water, so as to extend the service life of the thimble ensuring guidance of a probe measuring neutron flux right up as far as the inside a fuel assembly of the core of the reactor, the thimble being introduced into a guidance duct consisting of a guidance tube Joining a measurement room to the vessel the nuclear reactor in which the core is placed, a vertical channel passing through the lower internals of the reactor, beneath the core in line with a vertical tube guide of the assembly and the tube guide of the fuel assembly, so that the closed end of the thimble penetrates inside the tube guide of the assembly, as far as a predetermined level, this method making it possible to avoid excessive wear of the wall of the thimble in exposed zones, during extended use of the nuclear reactor.

With this objective, the position of the thimble is modified along the axis of the guidance duct, between two successive periods of continuous use of the thimble so as to ensure the guidance of the measurement probe in the operating nuclear reactor, so as to modify the position of at least one heavy wear zone of the wall of the thimble with respect to at least one zone of the guidance duct.

The invention also relates to a device for adjusting the position of a thimble in the axial direction of a guidance duct allowing the implementation of the method according to the invention.

BRIEF DESCRIPTION OF THE DRAWINGS

In order that the invention may be more clearly understood, there will now be described, by way of example, and with reference to the appended drawings, an embodiment of the method according to the invention and the adjusting devices used for implementing the method.

FIG. 2 is a view in elevation and in section of the part of a guidance duct of a thimble which is inside the vessel of a nuclear reactor.

FIG. 3 is a view in elevation and in vertical section of an instrumentation tube-guide of a fuel assembly in which a thimble is introduced in the service position.

DESCRIPTION OF PREFERRED EMBODIMENT

Figure 1:
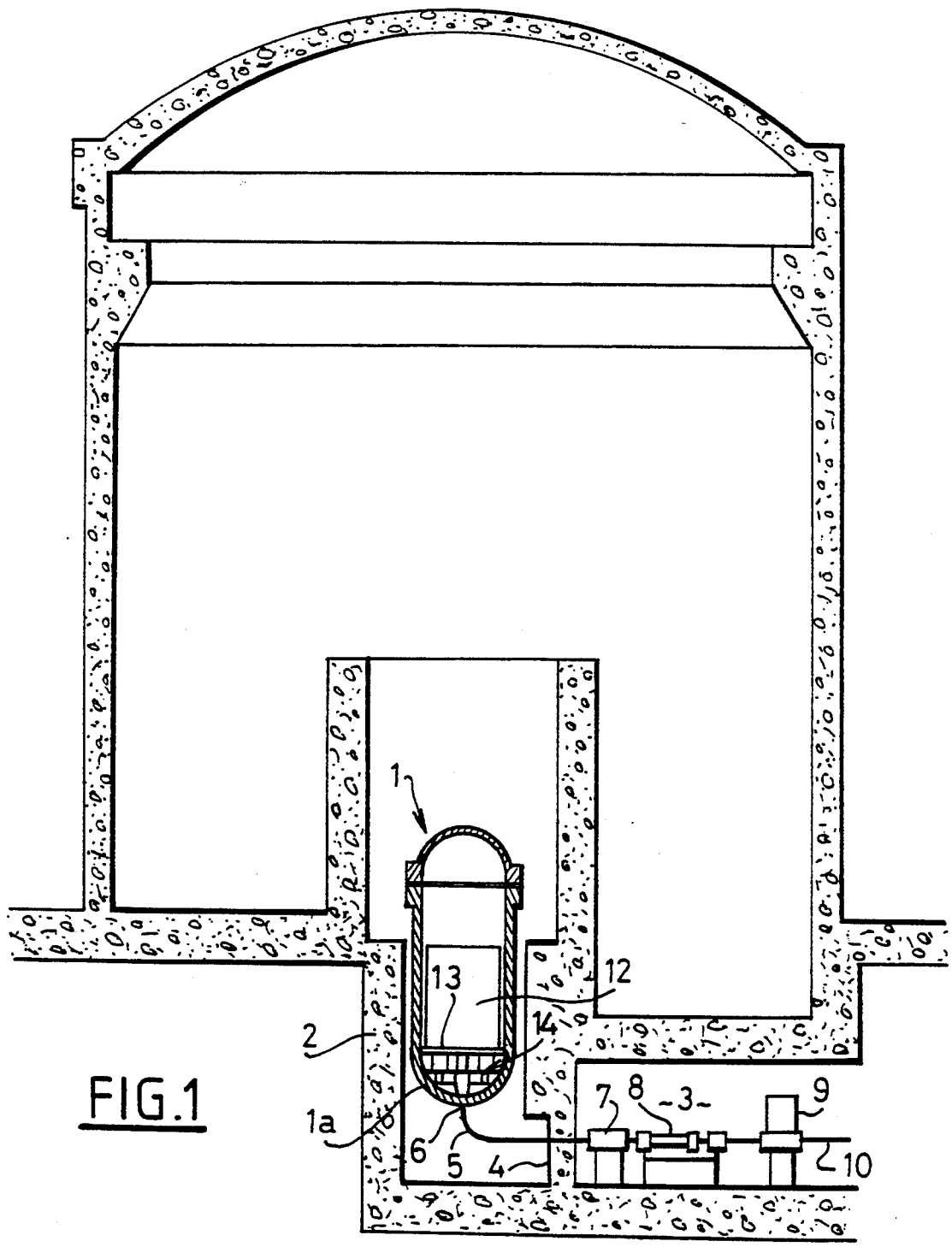
FIG. 1 is a schematic view in elevation and in partial section of the vessel of a pressurized water nuclear reactor and of instrumentation means for this vessel.

FIG. 1 shows the vessel 1 of a pressurized water nuclear reactor arranged inside a vessel well 2 constituting part of the concrete structure of the nuclear reactor.

A measurement room 3 surrounded by concrete walls is arranged laterally with respect to the vessel well. One of the side walls 4 of the room 3 separates this room from the vessel well 2. Instrumentation guidance ducts 5 are connected at one of their ends to a vertical penetration sleeve 6 for passing through the bottom of the vessel 1 and comprise, starting from the vessel, a vertical part, a bent part and a horizontal part passing through the wall 4 of the measurement room 3 in a sealed manner.

On the horizontal extension of the guidance duct 5 inside the room 3 there are arranged, in particular, a manual safety valve 7, a seal 8 and an automatic valve 9.

The end of the thimble 10 placed inside the guidance duct 5 is accessible at the end of the guidance duct 5, inside the room 3, so that it is possible to introduce and to displace within the thimble 10 a probe for measuring neutron flux fastened to the end of a teleflex cable, from the room 3.

Further more, it is possible to carry out the partial extraction and the installation of the thimbles in the guidance ducts from the measurement room 3.

The seal 8 makes it possible to ensure the sealed passage of the thimble to which an extension is connected at the exit of the seal 8.

The vessel 1 of the reactor encloses the core 12 consisting of juxtaposed fuel assemblies of prismatic shape resting on a core support plate 13 forming part of the internals 14 arranged in the lower part of the vessel 1, closed by a domed bottom 1a.

FIG. 2 represents part of the vessel bottom 1a of domed shape, at the level of a penetration consisting of sleeve 6 fastened by welding in a hole for passing through the vessel bottom 1a.

The end of instrumentation guidance duct 5 is fixed to the end of the penetration sleeve 6, outside the bottom 1a.

The internals 14 of the vessel comprise, in the axial extension of the penetration sleeve 6 of vertical direction, an instrumentation column 15 the open lower part of which has an inside diameter substantially greater than the diameter of the sleeve 6, and which is engaged over the upper end of the sleeve with a large radial clearance.

The upper part of the column 15 is fastened under the core support plate 13, at the level of a penetration opening of this support plate opening out under the lower end piece of a fuel assembly 20 of the core of the reactor, by means of a guidance conduit 16 opening out at a small distance beneath the lower end of the instrumentation tube guide 17 of the assembly 20.

The inside bore of the penetration sleeve 6, the inner passage of the instrumentation column 15, the penetration opening of the core support plate 13 and the bore of the guidance conduit 16 have one and the same vertical axis in the extension of the axis of the tube guide 17 of the assembly 20.

These elements constitute the part of the instrumentation guidance duct situated inside the vessel and to which the guidance tube 5 is connected, at the level of the lower end of the sleeve 6.

The continuous passage of the thimble 10 can thus be ensured between the instrumentation room 3 and the tube guide 17 of the fuel assembly inside the vessel 1.

In FIG. 3, the upper part of the instrumentation tube guide 17 of the assembly 20 can be seen fastened to the upper end piece 21 of the assembly.

The thimble 10, which is closed at its end by a bullet-shaped end plug 22, is introduced inside the tube guide 17 as far as the vicinity of its upper part.

When the thimble 10 is in its service position inside the tube guide 17, the upper end of the bullet-shaped end plug 22 is at a reference level 24 defined in a very precise manner.

The probe 25 for measuring neutron flux fastened to the end of a teleflex cable 26 may be displaced inside the thimble, so as to be able to carry out measurements at any level over the height of the assembly, i.e., at any level over the height of the core.

When the nuclear reactor is operational, cooling water circulates very fast inside the vessel, so as to pass through the core in a vertical direction from bottom to top.

The cooling water which is sent at high speed and high flow-rate under the core support plate penetrates the instrumentation guidance ducts and comes into contact with the thimbles.

Furthermore, a free space remains between the guidance conduit 16 and the lower end of the instrumentation tube guide 17, so that in this free space the thimble is not protected and is subjected to the circulating flow of cooling water.

As a result, the thimbles vibrate inside the part of the guidance duct situated inside the vessel.

The thimble is set in vibration inside the guidance duct and comes into frictional contact with the inner part of the guidance duct, in certain zones situated, in particular in the vicinity of the core support plate.

Due to the fact that the thimble is always placed in an identical position along the axial direction of the guidance duct, this position corresponding to the position of the upper part of the bullet-shaped end plug 22 at the reference level 24, the thimble wears disproportionately in certain zones placed in perfectly defined positions along its length.

This progressive wear during the use of the thimble may necessitate replacement of the thimble due to the deterioration brought about by the wear.

Figure 4:
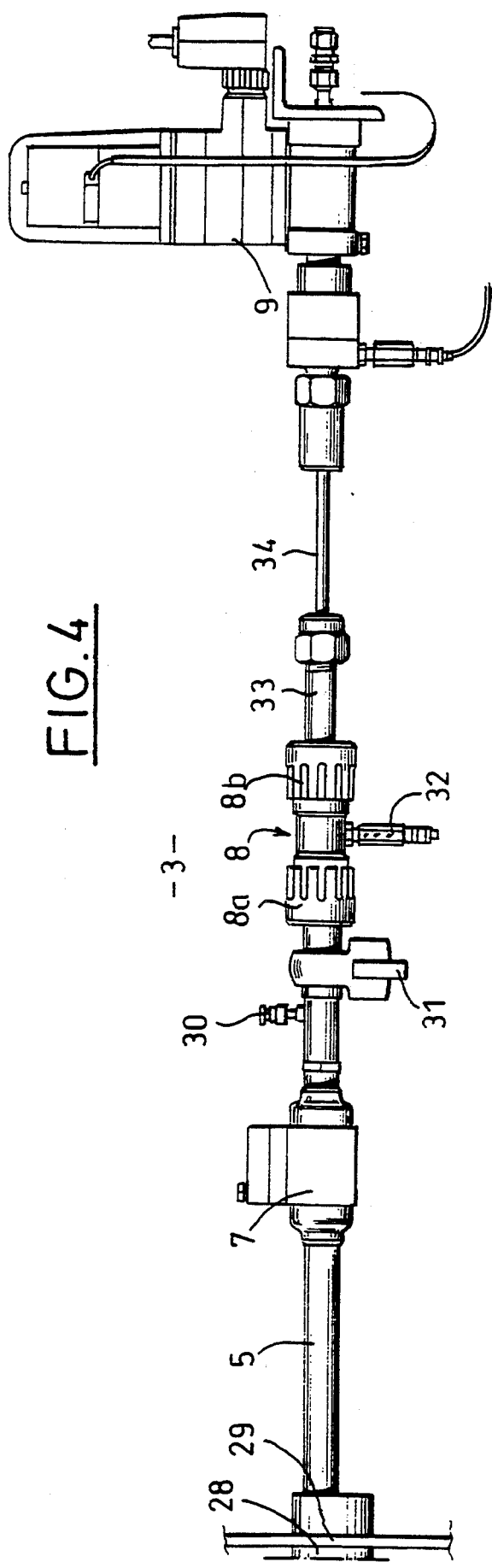
FIG. 4 is a view in side elevation of part of the elements of a guidance duct of a thimble placed inside the measurement room.

FIG. 4 shows the part of the instrumentation guidance duct penetrating inside the measurement room 3.

The guidance duct passes through the wall 4 of the room, in a sealed manner, inside a penetration sleeve 28 fixed to the inside of the room on a penetration plate 29.

The guidance tube 5 constituting the inner part of the guidance duct is connected to the manual valve 4 ensuring opening and closing of the guidance duct, which valve is itself connected to the seal assembly 8 by means of a duct element on which there is arranged a pressurizing connector 30. The seal 8 is fastened by means of a seal support 31 and comprises a leak detector 32.

On the outlet end of the seal 8 there is fastened a thimble extension 33.

The thimble extension 33 is connected to the motorized valve 9 by means of a duct element 34.

The assembly represented in FIG. 4 and situated in the measurement room 3 makes it possible to ensure sealed outlet of the probe support introduced into the thimble, to monitor sealing and to prevent any outlet of primary fluid into the measurement room.

Figure 5:
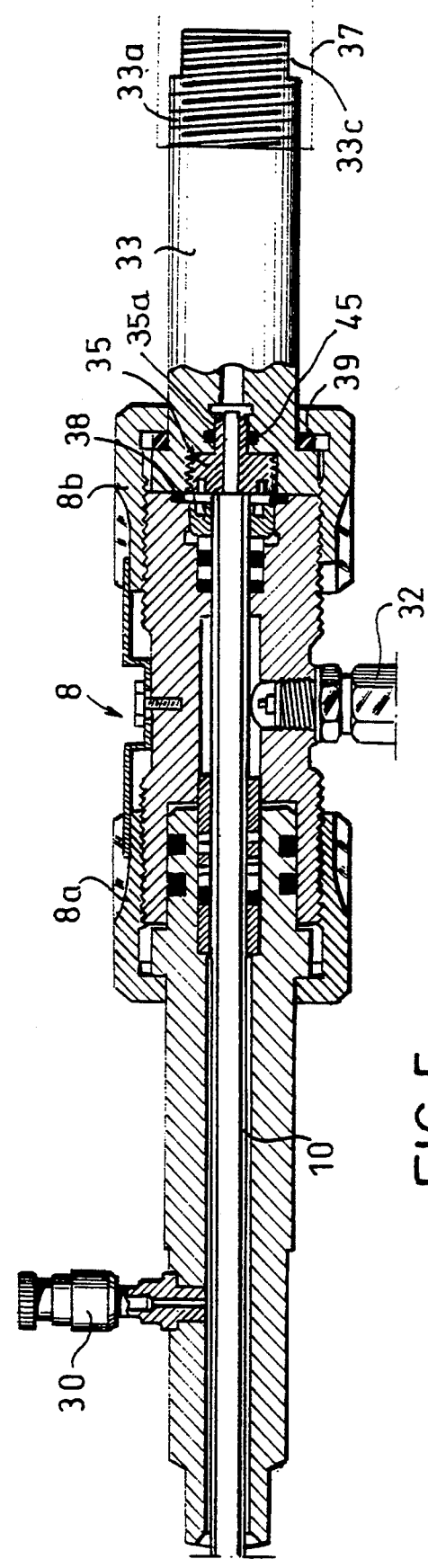
FIG. 5 is a sectional view on a larger scale of part of the guidance duct represented in FIG. 4 showing the means for fastening the thimble.
Figure 6:
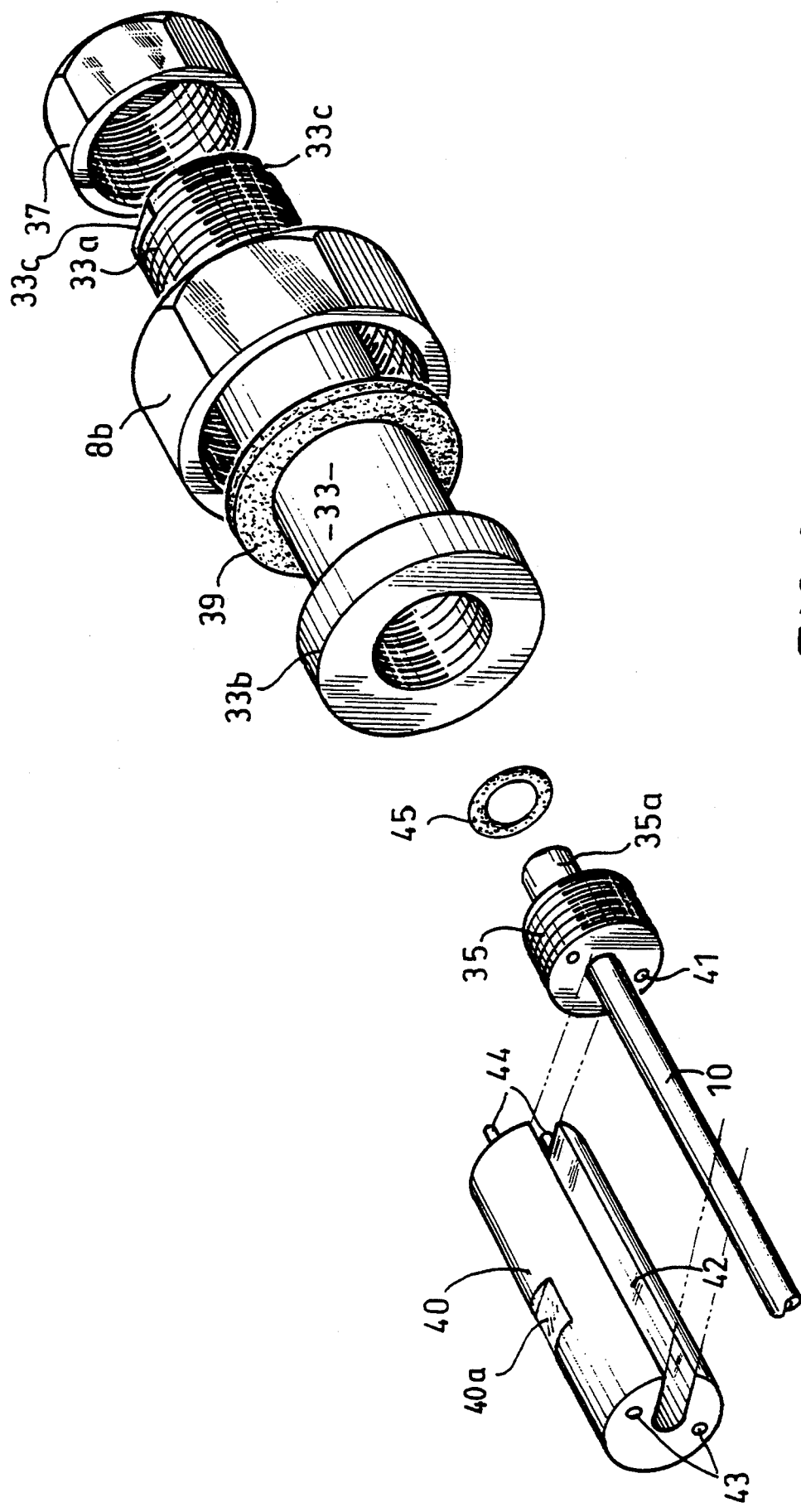
FIG. 6 is an exploded view in perspective of the means for fastening the thimble in the guidance duct.

As can be seen in FIG. 5, the seal 8, which is conventional in the art, comprises inner sealing elements around the thimble 10 and screwed connection rings 8a and 8b making it possible to connect the seal 8 to the part of the guidance duct connected to the manual valve 7 upstream and to the thimble extension 33 downstream, respectively.

At its connection end with the extension 33, the thimble 10 comprises an externally threaded fastening component 35 extended by a smooth end piece 35a of small diameter, chamfered at its ends, to which may be screwed the thimble extension 33, which comprises a tapped inner bore for this purpose.

The thimble extension 33 also comprises an outer threaded part 33a allowing the connection of the end part of the guidance duct to the extension 33 by means of a nut 37.

The threaded part 33a of the extension 33 comprises two flats 33c allowing a wrench to be engaged over the body of the extension.

In order to extract a thimble from the guidance duct, the extension of the duct is disconnected by unscrewing the nut 37, then the extension 33 of the seal 8 is disconnected by unscrewing the ring 8b.

Traction can then be exerted on the thimble by means of the extension 33.

The thimble can be reinstalled by exerting a thrust on the extension 33.

Sealing around the thimble is ensured by the seal 8 which comprises sealing gaskets constituting sealed sliding bearings for the thimble 10.

Reference will now be made to FIGS. 6 and 7A, 7B, 7C to describe, in more detail, the method for joining the thimble 10 and the extension 33 by means of the threaded component 35, and the means making it possible to implement the method according to the invention by adjusting the axial position of the thimble 10 in the guidance duct.

The extension 33 comprises a cylindrical body pierced with a central bore allowing the passage of the probe support into the extension of the thimble 10 and comprising a widened tapped part for fastening the thimble 10, by means of the threaded component 35, extended by a smooth opening allowing the end piece 35a to be received.

The extension 33 comprises a shoulder 33b on which the threaded ring 8b for connecting to the seal 8 comes to bear. Sealing gaskets 38 and 39 are interposed between the shoulder 33b of the extension 33 and the nut 8b and the seal 8, respectively.

The threaded connection component 35 is welded to the end of the thimble 10 and comprises two cavities 41 in which two pins of a pin wrench may be engaged when the adapter is fastened, or two pins or a spacer 40 may be engaged allowing the axial position of the thimble 10 in the guidance duct to be adjusted.

Figure 7A:
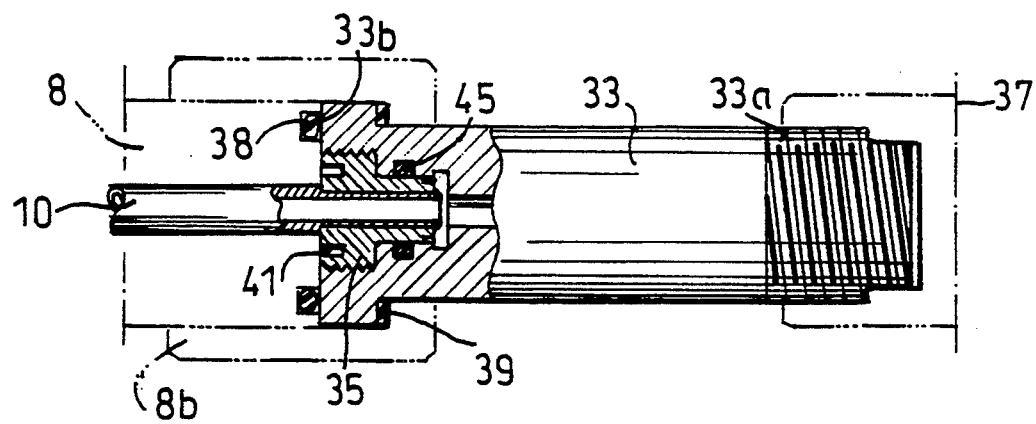
FIGS. 7A, 7B and 7C are sectional views of the means for fastening the thimble in the guidance duct, in three positions along the axial direction.
Figure 7B:
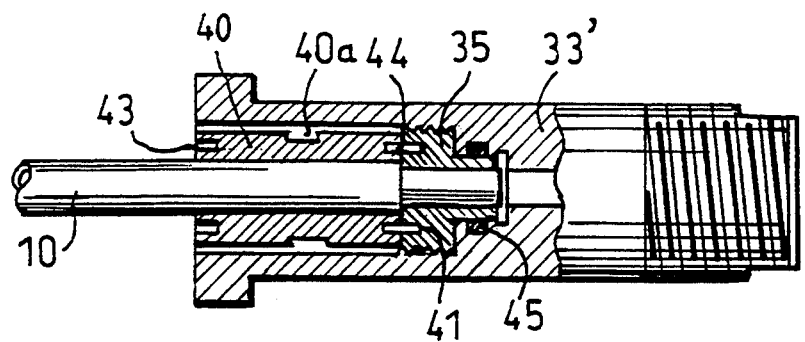
Figure 7C:
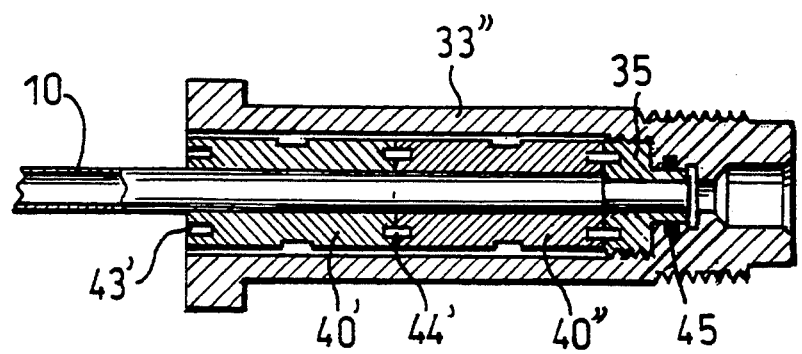

As can be seen in FIGS. 7B and 7C, the axial position of the thimble 10 is adjusted by screwing the threaded component 35 right to the bottom of the bore and by using one or more spacers such as 40 (FIG. 7B) or 40' and 40" (FIG. 7C).

In order to adjust the thimble 10 in the axial position implementing one or more spacers such as 40, 40' and 40", thimble extensions 33' and 33" comprising a large-diameter inner bore of a suitable length are used.

The spacer such as 40 comprises a radial slot 42 allowing the engagement of the thimble 10 in the spacer 40 as far as its central part, by simply introducing the spacer laterally, and two flats such as 40a for the engagement of a holding wrench.

The spacer such as 40 also comprises, at one of its ends, two projecting pins 44 and, at its other end, two orifices 43 enabling two pins such as 44 of another spacer to be received (in the event of assembling several spacers such as 40' and 40" represented in FIG. 7C) or making it possible to receive the pins of a pin wrench, so as to tighten the extension on the thimble.

Mounting the extension 33 on the thimble 10 may fasten the thimble in one of the three axial positions corresponding to FIGS. 7A, 7B or 7C.

In order to perform the mounting represented in FIG. 7A, corresponding to a first position of the thimble 10, called a top position, inasmuch as the end of the thimble is in its uppermost position inside the fuel assembly (position 24a in FIG. 3), the extension 33 is simply screwed onto the threaded fastening component 35, for example by means of a wrench engaged with the flats 33c. An O-ring seal 45 is engaged over the smooth end piece 35a and is placed in a housing consisting of a diametrically widened part of the smooth opening for receiving the end piece 35a.

Tightening may be carried out by rotationally locking the thimble by introducing a pin wrench into orifices 41 in component 35.

The extension 33 and the thimble 10 may then be fixed to the seal assembly 8 by the connection ring 8b, as shown in FIG. 7A. The thimble is then immobilized inside the guidance duct in a fixed axial position corresponding to its top position.

In order to fasten the thimble inside the guidance duct in an intermediate position, as represented in FIG. 7B (position 24 in FIG. 3), a spacer such as 40 is introduced laterally onto the tubular body of the thimble 10, by virtue of the slot 42. The spacer 40 is then displaced axially along the thimble 10, so that the pins 44 of the spacer come to be engaged in the orifices 41 of the fastening component 35.

An adapter 33' comprising a threaded large-diameter inner bore whose axial length corresponds to the sum of the axial length of the component 35 and of the spacer 40 is screwed onto the fastening component 35.

The outer diameter of the spacer 40 is less than the minimum diameter of the thread of the large-diameter bore, so that the spacer connected to the component 35 by the pins 44 may be introduced inside the large-diameter bore.

In order to produce the screwing of the adapter 33' onto the fastening component 35 of the thimble, the latter may be rotationally immobilized by a wrench comprising pins which are introduced into the orifices 43 of the spacer 40 or by a wrench engaged on the flats 40a.

When the extension 33' is fastened onto the seal 8 via the tapped ring 8b, the spacer 40 is held firmly between the conduit 8 and the fastening component 35.

It should be noted that the adapter 33' has an outer shape and dimensions identical to those of the extension 33.

In the same manner, the axial position of the thimble 10 may be modified and adjusted without in any way modifying the elements of the guidance duct connected to the extension.

However, in order to be able to distinguish, from the outside, the method for mounting and for positioning the thimble, a number of grooves corresponding to the type of extension and to the position of the thimble are machined on the outside surface of the extensions 33 and 33'.

FIG. 7C represents a third type of mounting of the thimble 10 allowing it to be placed in a third axial position, called a bottom position (position 24b in FIG. 3), inasmuch as the end of the thimble is then inside the fuel assembly in a position situated at a level lower than the level corresponding to the mountings of FIGS. 7A and 7B.

In order to produce this mounting, an extension 33'' is used, comprising a large-diameter threaded inner bore of a length equal to the sum of the axial lengths of the fastening component 35 and of the spacers 40' and 40'' which are interlocked in one another by means of end pins 44' of the spacer 40' engaged in orifices of the spacer 40''.

The fastening of the extension 33'' by screwing onto the thimble may be carried out by using a wrench comprising pins which are engaged in the orifices 43' of the spacer 40' or a wrench engaged with the flats of the spacer, so as to immobilize the thimble.

The extension 33'' has a shape and external dimensions identical to those of the extension 33 and of the extension 33'.

Outside grooves in a different number may allow the extension 33'' to be distinguished from the extensions 33 and 33'.

The thimble can thus be adjusted into the third or bottom position without modifying the elements for mounting the extension on the guidance duct.

The axial position of a thimble can thus be modified very easily inside the guidance duct, after a certain time of use of the thimble inside the nuclear reactor, so as to modify the position of the wear zones along the length of the thimble and therefore to extend the service life of the thimble.

Generally, thimbles of pressurized water nuclear reactors are mounted as represented in FIG. 7B, so that the end of the thimble inside the tube-guide of the fuel assembly is at an intermediate reference level.

It is therefore possible, by using means represented in FIGS. 6 and 7A to 7C, to modify the position of the thimble twice, once by removing the spacer 40 and by producing a mounting according to FIG. 7A and a second time by using two spacers such as 40' and 40'' represented in FIG. 7C.

The corresponding extension will be machined internally so as to have a large-diameter tapped bore whose length corresponds to the type of mounting.

The method and the devices according to the invention therefore make it possible to extend the service life of a thimble in a guidance duct, in a simple manner and without modifying the means for connecting the guidance duct.

The thimble may be displaced axially with a variable amplitude, by using one or more spacers of suitable length and an extension comprising a large-diameter inner bore whose length corresponds to the sum of the axial lengths of the connection component of the thimble and of the spacer or spacers.

It is possible to provide for only two positions of the thimble, naively a top position and a bottom position, instead of three positions as in the example described.

The invention applies to any pressurized water nuclear reactor regardless of the arrangement of the measurement room with respect to the vessel well and regardless of the arrangement of the guidance duct in the measurement room.

In particular, the method and the device according to the invention apply equally well in the case of a guidance duct having a horizontal arrangement in the measuring room as to a guidance duct having a vertical end part (U-shaped instrumentation duct).

I claim:

1. In a nuclear reactor comprising a vessel, a core comprised of fuel assemblies and lower internals of the reactor disposed in the vessel, a measurement room outside the vessel, at least one guidance tube joining the measurement room to the vessel, at least one vertical channel passing through the lower internals, beneath the core in line with a vertical tube guide of a fuel assembly of the core, and at least one thimble ensuring guidance of a probe, the method comprising the steps of
   (a) introducing the thimble in a guidance duct comprising the guidance tube, the vertical channel and the vertical tube guide of the assembly, so that a closed end of the thimble penetrates inside the tube guide as far as a predetermined level, corresponding to a first position of the thimble, in the guidance duct;
   (b) measuring neutron flux inside the assembly when the reactor is operating, through the probe guided into the thimble, over a first period of use;
   (c) displacing the thimble along the axis of the guidance duct from said first position to a second position, from the measurement room; and
   (d) measuring neutron flux inside the assembly in the reactor, over a second period of use, the position of at least one preferential wear zone of the thimble being different with respect to at least one zone of the guidance tube during said first and second periods of use.

2. The method according to claim 1, comprising the step of further displacing the thimble from said second position to a third position different from said first and second positions.

3. The method according to claim 2, comprising displacing the thimble from said first to said second position in a first direction and from said second to said third position in a second direction along the axis of the guidance duct.

4. Method according to any one of claims 1 to 3, wherein the guidance duct comprises, inside the measurement room, a seal assembly in which the thimble is slidingly and sealingly engaged and to which the thimble is fastened by means of an extension comprising a tapped inner bore into which is screwed a threaded fastening component securely fastened to an end of the thimble, said method comprising modifying an axial position of the thimble in the guidance duct by (a) dismantling the connection between the extension and the seal;
(b) separating the extension from the thimble by unscrewing;
(c) screwing onto the threaded fastening component of the thimble a new extension comprising a tapped inner bore of a length different from the length of the bore of said first extension and introducing at least one spacer around the thimble inside the bore of the extension if the length of the part of the large-diameter bore of the extension is greater than the axial length of the fastening component of the thimble, the spacer being interposed between the fastening component and a shoulder of the extension intended to come into contact with the end of the seal.

5. Device for adjusting the axial position of a thimble inside an instrumentation guidance duct of a pressurized water nuclear reactor, said device comprising, in a measurement room, a tubular seal assembly allowing sliding and sealed passage of the thimble and of means for fastening the thimble in the guidance duct, by means of an extension comprising a central bore having a large-diameter threaded part on the side of a shoulder of the extension intended to come to bear against the seal against which the shoulder is held by a screwed ring, and the extension whose large-diameter tapped part of the inner bore having one end in the plane of the shoulder has a variable length allowing the axial position of the measurement duct whose threaded fastening component is screwed right to the bottom of the large-diameter tapped bore of the extension to be modified.

6. Adjusting device according to claim 5, further comprising at least one cylindrical spacer having a diameter smaller than the diameter of the bore of the extension in the large-diameter tapped part of the inner bore of the extension and having, over its entire length in the axial direction, a slot in the radial direction, as far as the central part of the spacer whose width is greater than the diameter of the thimble.

7. Adjusting device according to claim 6, wherein a first axial end of the spacer comprises at least two orifices and a second axial end of the spacer comprises at least two axially projecting pins, so as rotationally to securely fasten two successive spacers inside the large-diameter bore of the extension by engagement of pins of a spacer in the orifices of a second spacer.

8. Device according to any one of claims 5 to 7, wherein the threaded fastening component of the thimble comprises at least two orifices for the engagement of pins of a pin wrench when the extension is fastened by screwing or for the engagement of pins of a spacer.

* * * * *